(12) United States Patent
Limb et al.

(10) Patent No.: US 8,654,775 B2
(45) Date of Patent: *Feb. 18, 2014

(54) METHODS OF ALLOCATING PACKETS IN A WIRELESS COMMUNICATION SYSTEM

(75) Inventors: John Limb, Atlanta, GA (US); Daniel Howard, Atlanta, GA (US); Dolors Sala, Atlanta, GA (US); Richard Protus, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 343 days.
This patent is subject to a terminal disclaimer.

(21) Appl. No.: 13/052,853

(22) Filed: Mar. 21, 2011

(65) Prior Publication Data

US 2011/0170507 A1 Jul. 14, 2011

Related U.S. Application Data

(60) Division of application No. 11/808,696, filed on Jun. 12, 2007, now Pat. No. 7,912,066, which is a (Continued)

(51) Int. Cl.
*H04L 12/28* (2006.01)
*H04L 12/56* (2011.01)

(52) U.S. Cl.
USPC .................. 370/395.41; 370/236; 370/420

(58) Field of Classification Search
USPC ............... 370/328–329, 335–345, 230–232, 370/532–545
See application file for complete search history.

(56) References Cited

U.S. PATENT DOCUMENTS 4,534,024 A 8/1985 Maxemchuk et al.
4,712,210 A 12/1987 Davis et al.

(Continued)

FOREIGN PATENT DOCUMENTS

EP 0 573 739 12/1993
EP 0 774 848 5/1997

(Continued)

OTHER PUBLICATIONS

Limb, J. and Sala, D., "A Protocol for Efficient Transfer of Data over Hybrid Fiber/Coax Systems,"*IEEE/ACM Transactions on Networking*, vol. 5, No. 6, pp. 872-881, Dec. 1997.

(Continued)

*Primary Examiner* — Thai Hoang
(74) *Attorney, Agent, or Firm* — Sterne, Kessler, Goldstein & Fox PLLC

(57) ABSTRACT

In a wireless communication system, a multi-source data multiplexing system (e.g., a media access control (MAC)) accepts information packets from a plurality of signal sources, evaluates the relative efficiencies of data transmission, and transmits the information packets in provided grant regions for maximum efficiency. The multi-source data multiplexing system may accept any form of information packet from any form of signal source. The system receives a grant region, typically including a transmission time on a data channel, and inserts an information packet into the grant region. The actual information packet placed in the grant region may be one other than the packet for which the grant region was intended. Further, the multi-source data multiplexing system may fragment an information packet and transmit only a portion of the information packet in the grant region. Alternately, the multi-source data multiplexing system may concatenate multiple information packets, or information packet fragments, from any combination of signal sources and transmit the concatenated result in the grant region. As long as any signal source is active, the composite flow of information packets remains active, and the composite flow then serves as the primary mechanism for requesting and transmitting additional bandwidth in the wireless communication system.

20 Claims, 6 Drawing Sheets

Related U.S. Application Data

(60) continuation of application No. 10/910,622, filed on Aug. 4, 2004, now Pat. No. 7,697,543, which is a continuation of application No. 09/427,792, filed on Oct. 27, 1999, now Pat. No. 6,804,251.

(60) Provisional application No. 60/108,070, filed on Nov. 12, 1998.

(56) References Cited

U.S. PATENT DOCUMENTS

| | | | |
|---|---|---|---|
| 5,315,586 A | 5/1994 | Charvillat | |
| 5,341,374 A | 8/1994 | Lewen et al. | |
| 5,421,030 A | 5/1995 | Baran | |
| 5,425,027 A | 6/1995 | Baran | |
| 5,463,624 A | 10/1995 | Hogg et al. | |
| 5,469,495 A | 11/1995 | Beveridge | |
| 5,515,379 A | 5/1996 | Crisler et al. | |
| 5,539,449 A | 7/1996 | Blahut et al. | |
| 5,570,355 A | 10/1996 | Dail et al. | |
| 5,606,561 A | 2/1997 | Scheibel, Jr. et al. | |
| 5,631,908 A | 5/1997 | Saxe | |
| 5,742,592 A | 4/1998 | Scholefield et al. | |
| 5,742,772 A | 4/1998 | Sreenan | |
| 5,756,280 A | 5/1998 | Soora et al. | |
| 5,850,400 A | 12/1998 | Eames et al. | |
| 5,914,950 A | 6/1999 | Tiedemann et al. | |
| 5,926,478 A | 7/1999 | Ghaibeh et al. | |
| 5,963,557 A | 10/1999 | Eng | |
| 5,982,780 A | 11/1999 | Bohm et al. | |
| 6,028,860 A | 2/2000 | Laubach et al. | |
| 6,055,268 A | 4/2000 | Timm et al. | |
| 6,185,224 B1 | 2/2001 | Limb et al. | |
| 6,259,695 B1 | 7/2001 | Ofek | |
| 6,314,103 B1 | 11/2001 | Medhat et al. | |
| 6,314,466 B1 | 11/2001 | Agarwal et al. | |
| 6,359,901 B1 | 3/2002 | Todd et al. | |
| 6,363,079 B1 | 3/2002 | Barzegar et al. | |
| 6,421,355 B1 | 7/2002 | Quiring et al. | |
| 6,438,141 B1 | 8/2002 | Hanko et al. | |
| 6,438,630 B1 | 8/2002 | DeMoney | |
| 6,463,484 B1 | 10/2002 | Moss | |
| 6,466,544 B1 | 10/2002 | Sen et al. | |
| 6,480,506 B1 | 11/2002 | Gubbi | |
| 6,546,017 B1 | 4/2003 | Khaunte | |
| 6,563,829 B1 * | 5/2003 | Lyles et al. | 370/395.21 |
| 6,580,730 B1 | 6/2003 | Loukianov | |
| 6,590,865 B1 | 7/2003 | Ibaraki et al. | |
| 6,628,609 B2 | 9/2003 | Chapman et al. | |
| 6,650,630 B1 | 11/2003 | Haartsen | |
| 6,658,457 B2 | 12/2003 | Nishikawa et al. | |
| 6,724,772 B1 | 4/2004 | Borland et al. | |
| 6,771,661 B1 | 8/2004 | Chawla et al. | |
| 6,778,495 B1 | 8/2004 | Blair | |
| 6,804,251 B1 * | 10/2004 | Limb et al. | 370/444 |
| 6,876,668 B1 | 4/2005 | Chawla et al. | |
| 6,917,614 B1 | 7/2005 | Laubach et al. | |
| 6,993,007 B2 | 1/2006 | Gummalla et al. | |
| 6,993,414 B2 | 1/2006 | Shah | |
| 6,999,414 B2 | 2/2006 | Gummalla et al. | |
| 7,061,929 B1 | 6/2006 | Eberle et al. | |
| 7,203,164 B2 | 4/2007 | Gummalla et al. | |
| 7,219,347 B1 | 5/2007 | Waddington | |
| 7,237,016 B1 | 6/2007 | Schober | |
| 7,272,119 B2 | 9/2007 | Rudnick et al. | |
| 7,333,495 B2 * | 2/2008 | Sala et al. | 370/395.21 |
| 7,388,884 B2 | 6/2008 | Bunn et al. | |
| 7,512,154 B2 | 3/2009 | Quigley et al. | |
| 7,602,721 B1 | 10/2009 | Tangirala et al. | |
| 7,697,543 B2 * | 4/2010 | Limb et al. | 370/395.42 |
| 7,912,066 B2 * | 3/2011 | Limb et al. | 370/395.41 |
| 7,940,774 B2 * | 5/2011 | Sala et al. | 370/395.21 |
| 2001/0053159 A1 | 12/2001 | Bunn et al. | |
| 2006/0088057 A1 | 4/2006 | Gummalla et al. | |
| 2007/0030807 A1 | 2/2007 | Gummalla et al. | |
| 2007/0242673 A1 | 10/2007 | Limb et al. | |
| 2007/0242693 A1 | 10/2007 | Limb et al. | |
| 2007/0297436 A1 | 12/2007 | Sala et al. | |
| 2011/0211479 A1 * | 9/2011 | Sala et al. | 370/252 |

FOREIGN PATENT DOCUMENTS

| | | |
|---|---|---|
| EP | 0 829 986 | 3/1998 |
| EP | 0 844 803 | 5/1998 |
| EP | 0 912 016 | 4/1999 |
| WO | WO 98/45678 | 10/1998 |
| WO | WO 99/18718 | 4/1999 |
| WO | WO 99/30449 | 6/1999 |

OTHER PUBLICATIONS

"Radio Frequency Interface Specification SP-RFIv1.1-I02-990731," *Data-Over-Cable Service Interface Specifications*, Jul. 31, 1999, retrieved from the Internet on Oct. 23, 2001:<URL:http://www.tconl.com/ikleens/DOCSIS.pdf>. pp.i-iv, 132-139 and 291-296.

International Search Report issued Nov. 8, 2001, for Appln. No. PCT/US01/04841, 5 pages.

International Search Report issued Nov. 8, 2001, for Appln. No. PCT/US01/04904, 4 pages.

Sala, D. et al., "Adaptive Control Mechanism for Cable Modem MAC Protocols." *Proceedings of the IEEE INFOCOM, IEEE*, vol. 3, Mar. 29, 1988, pp. 1392-1399.

International Search Report issued Sep. 28, 2001, for Appln. No. PCT/US01/04819, 7 pages.

Limb, J. et al., "An Access Protocol to Support Multimedia Traffic Over Hybrid Fiber/Coax Systems", *Proceedings of the International Workshop on community Networking Integrated Multimedia Services to the Home*, Jun. 20, 1995, pp. 35-40.

International Search Report for Appl. No. PCT/US01/04820 issued Sep. 27, 2001, 8 pages.

Summer, M., "DOCSIS 1.1 Overview" .COPYRGT. 1999 CableLabes.RTM., May 3-7, 1999, May 11, 1999, 16 pgs.

Examination for European Application No. 01910716.8-1247 mailed October 9, 2009, 5 pages.

Hogan et al., "An Architectural Framework for the Support of Integrated Services by Broadband Customer Premises Equipment", XP004059230, *Computer Networks and ISDN Systems*, Apr. 1, 1997, pp. 595-609.

Office Communication, dated Aug. 4, 2005, for U.S. Appl. No. 09/783,404, filed Feb. 15, 2001 (now U.S. Pat. 7,333,495), 3 pages.

Office Communication, dated Aug. 10, 2005, for U.S. Appl. No. 09/783,404, filed Feb. 15, 2001 (now U.S. Pat. 7,333,495), 3 pages.

Office Communication, dated Apr. 23, 2007, for U.S. Appl. No. 09/783,404, filed Feb. 15, 2001 (now U.S. Pat. 7,333,495), 3 pages.

Office Communication, dated Sep. 19, 2007, for U.S. Appl. No. 09/783,404, filed Feb. 15, 2001 (now U.S. Pat. 7,333,495), 1 page.

Office Communication, dated Jan. 27, 2003, for U.S. Appl. No. 09/427,792, filed Oct. 27, 1999 (now U.S. Pat. 6,804,251), 6 pages.

Office Communication, dated Aug. 12, 2003, for U.S. Appl. No. 09/427,792, filed Oct. 27, 1999 (now U.S. Pat. 6,804,251), 7 pages.

Office Communication, dated Jan. 15, 2004, for U.S. Appl. No. 09/427,792, filed Oct. 27, 1999 (now U.S. Pat. 6,804,251), 7 pages.

Office Communication, dated Feb. 28, 2004, for U.S. Appl. No. 09/427,792, filed Oct. 27, 1999 (now U.S. Pat. 6,804,251), 3 pages.

Office Communication, dated Sep. 4, 2008, for U.S. Appl. No. 10/910,622, filed Aug. 4, 2004, 10 pages.

Office Communication, dated Apr. 9, 2008, for U.S. Appl. No. 10/910,622, filed Aug. 4, 2004, 14 pages.

Office Communication, dated Sep. 12, 2008, for U.S. Appl. No. 11/808,694, filed Jun. 12, 2007, 9 pages.

Office Communication, dated Apr. 30, 2009, for U.S. Appl. No. 11/808,694, filed Jun. 12, 2007, 6 pages.

Office Communication, dated Jan. 12, 2010, for U.S. Appl. No. 11/808,694, filed Jun. 12, 2007, 9 pages.

Office Communication, dated Jun. 8 2010, for U.S. Appl. No. 11/892,932, filed Aug. 28, 2007, 6 pages.

Office Communication, dated Sep. 8, 2008, for U.S. Appl. No. 09/783,404, filed Feb. 15, 2001, 8 pages.

(56) References Cited

OTHER PUBLICATIONS

Office Communication, dated Apr. 4, 2005, for U.S. Appl. No. 09/783,404, filed Feb. 15, 2001, 7 pages.
Notice of Allowance, dated Nov. 5, 2010, for U.S. Appl. No. 11/808,696, filed Jun. 12, 2007, 8 pages.
Office Communication, dated Jan. 12, 2010, for U.S. Appl. No. 11/808,696, filed Jun. 12, 2007, 13 pages.
Office Communication, dated Apr. 27, 2009, for U.S. Appl. No. 11/808,696, filed Jun. 12, 2007, 12, pages.
Office Communication, dated Apr. 27, 2009, for U.S. Appl. No. 11/808,696, filed Jun. 12, 2007, (now U.S. Pat. 7,912,066), 11 pages.
Office Communication, dated Nov. 24, 2009, for U.S. Appl. No. 10/910,622, filed Aug. 4, 2004, (now U.S. Pat. 7,697,543), 6 pages.
Office Communication mailed Jul. 13, 2010 for U.S. Appl. No. 11/808,696, filed Jun. 12, 2007, (now U.S. Pat. 7,912,066), 7 pages.
Notice of Allowance, dated Nov. 5, 2010, for U.S. Appl. No. 11/892,932, filed Aug. 28, 2007, (now U.S. Pat. 7,940,774), 6 pages.
Office Communications, dated Jun. 13, 2013, for U.S. Appl. No. 13/101,751, filed May 5, 2011, 5 pages.

* cited by examiner

METHODS OF ALLOCATING PACKETS IN A WIRELESS COMMUNICATION SYSTEM

CROSS-REFERENCE TO RELATED APPLICATIONS

This application is a divisional of U.S. patent application Ser. No. 11/808,696 filed Jun. 12, 2007, now allowed, which is a continuation of U.S. patent application Ser. No. 10/910,622 filed Aug. 4, 2004, now U.S. Pat. No. 7,697,543, which is a continuation of U.S. patent application Ser. No. 09/427,792 filed Oct. 27, 1999, now U.S. Pat. No. 6,804,251, which claims the benefit of U.S. Provisional Application No. 60/108,070 filed Nov. 12, 1998, all of which are incorporated herein by reference in their entireties.

BACKGROUND OF THE INVENTION

1. Field of the Invention

This invention relates generally to wireless communication systems, and more particularly to allocation of packets in a wireless communication system.

2. Background Art

Shared access networks such as cable television systems, the so-called 'wireless cable' systems, and power line data networks are now common. Cable systems are typically comprised of a central controller (referred to as a "headend") with one or more trunk lines extending therefrom. A series of feeder lines extends from each trunk into subscriber areas. Service lines run from the feeder lines to individual dwellings. The trunk, feeder lines, and service lines may be either fiberoptic or coaxial cable, or a combination of both. Each subscriber is attached via a line tap onto the feeder or service line. This permits users to freely access the data carried by the cable system, be it television programming or computer data.

Shared access networks may also be wireless, such as a wireless cable network. In the case of wireless cable networks, a single base station radiates and receives voice and data RF signals to and from a plurality of subscribers. In order to increase the capacity of the network without requiring additional frequency channels, the base station may use sectored antennas or multiple polarizations to decrease the number of subscribers sharing a given frequency band. However, as long as at least two subscribers share the same frequency, base station antenna sector, and polarization, then the wireless service also qualifies as a shared access medium.

Power line data and voice networks (i.e., power line multimedia networks) are additional examples of shared access networks. Subscribers share access to the power cables, much as cable subscribers share access to the coaxial cable signals. The power line signals may further be shared in that signals from a group of subscribers may be collected and transmitted to the service provider by wireless base stations in the neighborhood, and these base stations may also share bandwidth with other base stations prior to reaching the service provider's headend (or central controller) facility.

While shared access networks allow a phenomenal number of people access to information, they suffer problems in transmitting this information. When voice and data traffic are sent over such networks, they are often kept separate, usually via different frequency allocations, and often by using different physical and media access control (MAC) protocols. While less efficient and more costly to deploy, the separation of voice and data permit the quality requirements of voice traffic to be guaranteed, regardless of the data traffic load at any given instant.

Modern networks are emerging which integrate voice and data traffic. Thus, the two services share the overall bandwidth available. Such multimedia networks take the approach that voice packet data are formatted and transmitted in the same manner as data packets over the network. Asynchronous Transfer Mode (ATM) systems and internet protocol (IP) systems employ this approach. However, to ensure that voice packets are transmitted in a timely manner, bandwidth must be reserved on the network and managed by higher level entities. Further, a step called segmentation and reassembly (SAR) is required wherein large packets must be chopped up into smaller pieces for transport.

Take the example of IP voice and data transmitted over a hybrid fiber/coaxial cable network. Standards are being developed (among them, Data Over Cable System Interface Specification (DOCSIS)) in order to ensure that voice traffic may be given service priority, thus theoretically preventing degradation when mixed with data traffic. However, current methods of mixing voice and data are inefficient. Additional bits must be sent for each voice packet when compared to traditional time domain multiplexing (TDM), which is employed to transmit voice over circuit switched networks such as the public switched telephone network. Further, when technologies such as voice activity detection (VAD) are used, the voice traffic may still suffer under heavy data loading unless additional measures are taken.

Accordingly, there is a need for wireless communication systems and methods that address one or more of the aforementioned shortcomings of conventional shared access networks and methods.

BRIEF DESCRIPTION OF THE DRAWINGS/FIGURES

FIG. 1 displays an exemplary operating environment for an embodiment of the present invention.

Figure 8:
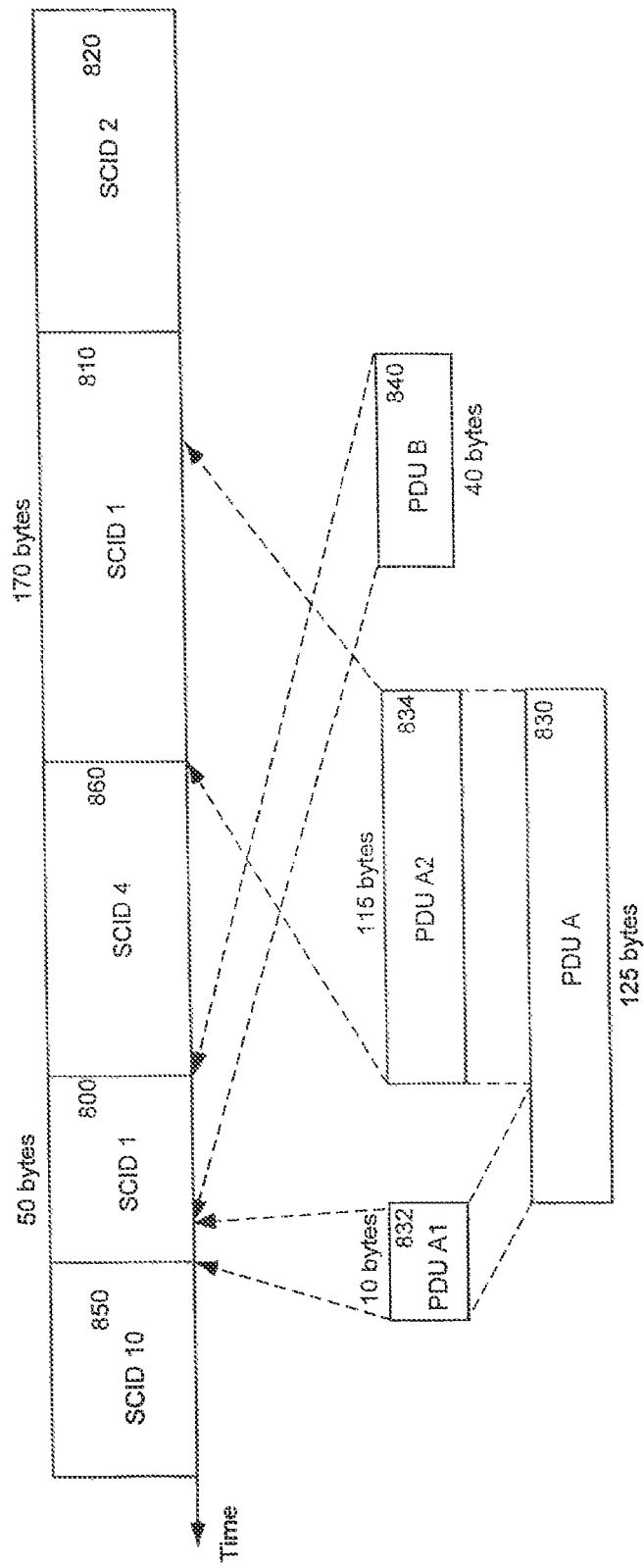

FIG. 8 displays a set of concatenated and fragmented information packets in accordance with an embodiment of the present invention.

DETAILED DESCRIPTION OF THE INVENTION

Multimedia networks may carry a combination of voice packets and data packets. Typically, such multimedia networks treat a voice packet as they would a data packet; formatting and transmission for both are handled equivalently, and may share the same bandwidth. For example, both the Asynchronous Transfer Mode (ATM) approach and internet protocol (IP) approach handle voice packets in this manner. However, an ATM approach requires reserving network bandwidth for voice packets. Further, bandwidth management is typically allocated on a call-by-call basis. ATM-style voice packet management also requires implementing segmentation and reassembly (SAR) of all data. Network communication of this sort typically takes place between a client computer or modem and a central controller. The client transmits a bandwidth request to the central controller, which in turn allocates bandwidth on the network as necessary and instructs the client when bandwidth is allocated and available.

Thus, an ATM system may allocate bandwidth on a call-by-call basis or even a cell by cell basis. Cell by cell allocation often results in the transmission time of the next data packet (or fragment thereof) being variable, depending on the bandwidth load of the network. Cell by cell allocation is also referred to as "bursty" allocation, because the central controller often assigns available bandwidth to the client in bursts.

Briefly described, segmentation and reassembly breaks a data packet into smaller chunks in order to be more easily handled by a network. The client sending the data then attaches a header to each chunk before transmitting them through the network. Further, network protocol dictates that each segment of the data packet be of a specific, predetermined size. Bandwidth provided by the network controller for data transmission is effectively quantized; the transmission slots made available to the client are of a fixed length.

In addition to segmenting the data packet in this manner, the ATM system also attaches a header to each data segment. The header is attached to every data segment, and carries exactly the same information each time it is attached. The header assists the destination computer in reassembling the data packet.

An alternate method for voice and data transportation is time domain multiplexing (TDM). TDM is commonly used in public switched telephone networks. TDM systems may allocate bandwidth on a call by call basis, but may also reserve bandwidth on a premises by premises basis. That is, each device or client attached to the network receives every nth slot; the time interval between transmissions from a single client is fixed. TDM systems therefore may have smaller headers or even no headers; since the central controller assigns the same slot each time to the same client, a presumption exists that a certain slot contains data from a specific client. The header may therefore omit any information pertaining to the originating client when data or voice packets from multiple clients are combined and transmitted.

The embodiment of the present invention integrates traffic (referred to herein as "information packets," which may be comprised of data and/or voice packets) from multiple sources into a flow, combining the periodic nature and minimal overhead characteristics of TDM voice with the transport of bursty data packets in a manner that increases the efficiency of both voice and data over a shared access medium. The flow may be periodic, as in voice packets, or it may be asynchronous, as in TCP/IP flows. As long as any single signal source is active, the flow is maintained in a manner that significantly reduces the overhead required for all signal sources using the flow. Hence, the usual segmentation and reassembly process which adds overhead to each component signal source is avoided in many cases. Example shared access media addressed by this invention include point to multi-point access systems such as cable modem networks, wireless networks, satellite networks, and power line networks.

A brief description of the operation of the preferred embodiment follows. An information packet flow from at least one signal source is set up on a connection between the multi-source multiplexing system and the corresponding demultiplexing system. Additional flows from other signal sources are multiplexed into the original flow to produce a composite flow. As long as at least one flow remains active, the composite flow remains active, and the composite flow then serves as the primary mechanism for requesting and transmitting additional bandwidth on the network. By appending or "piggybacking" requests for additional bandwidth on this composite flow, the usual contention-based process for requesting bandwidth may be avoided. This is in sharp contrast to mechanisms typically used today, such as the DOCSIS cable modem standard, where requests for bandwidth for one type of traffic (for example, data) may not be combined with transported packets of another type of traffic (for example, voice).

The central controller allocates bandwidth in the form of a "grant region," which is a contiguous portion of transmission time wherein a client may insert an information packet for transmission. The relationship between information packets waiting to be transmitted and a grant region on the network is decoupled. That is, the size of the packets waiting for transmission bears an indirect relationship to the size of the grant region; information packets from any source may be inserted into any grant region received by a client.

Exemplary Operating Environment for the Embodiment

Figure 1:
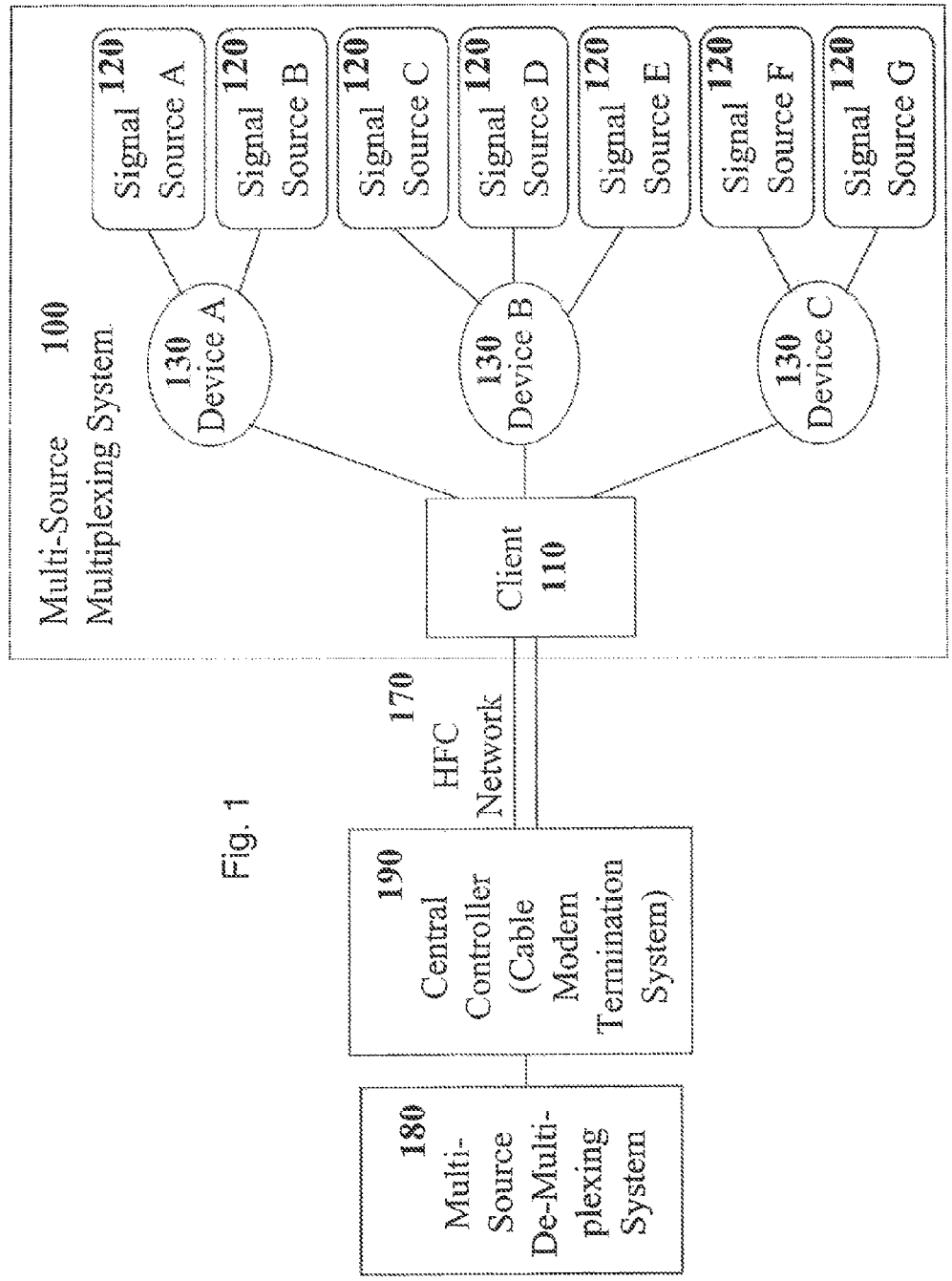

FIG. 1 displays an exemplary operating environment for the present embodiment. The multi-source multiplexing system 100 operates to multiplex data packets from different signal sources 120 onto a shared access media network, such as a hybrid fiberoptic/coaxial cable (HFC) network 170. Some shared access media networks contain a central controller 190; for example, a cable modem termination system acts as a central controller in an HFC network. Other examples of shared access media networks include power line networks, wireless cable networks, satellite networks, and so on.

Each signal source 120 may be any source capable of requesting or transmitting information (data or voice) packets across a shared access network, such as a telephone, computer program, set-top box and the like. A computer program may be a control program, such as an operating system, or a subordinate program, such as an application. Each signal source 120 feeds the information packet to a corresponding device 130. As used herein, the term "information packet" broadly includes any voice and data. The device 130 then transmits the information packet to client 110. In the example of an HFC network 170, the client 110 is typically a cable modem, although the invention may also be implemented by employing a cable modem as a device 130 and a combined cable modem/cable termination system as the client 110. Sample signal sources include audio streams, computer application programs such as web browsers, set-top boxes, and so on. Sample devices include telephones, computers, media terminal adapters, and the like.

The multi-source multiplexing system 100 may be composed solely of software that runs on an existing cable modem and/or cable modem termination system, or may be a combination of software and hardware. Further, although FIG. 1 displays the multi-source multiplexing system 100 as including separate clients 110, devices 130, and signal sources 120, one or more of these may be omitted from or combined in an embodiment and/or provided externally. For example, the client 110 and device 130 may both be a single cable modem, or the device 130 and signal source may be a telephone, and so on.

The demultiplexing system 180 separates the data packets multiplexed and transmitted across the network 170 by the multi-source multiplexing system 100. As in the case of the multi-source multiplexing system 100, the multi-source demultiplexing system 180 may be implemented as software running in an existing cable modem termination system, software running in a router or server 160 attached to the cable modem termination system, or as a separate unit. Again, although FIG. 1 displays the multi-source de-multiplexing system 180 as including a cable modem termination system 190 and a server/router 160, one or more of these may be omitted from an embodiment and/or provided externally.

The Data Channel

Figure 2:
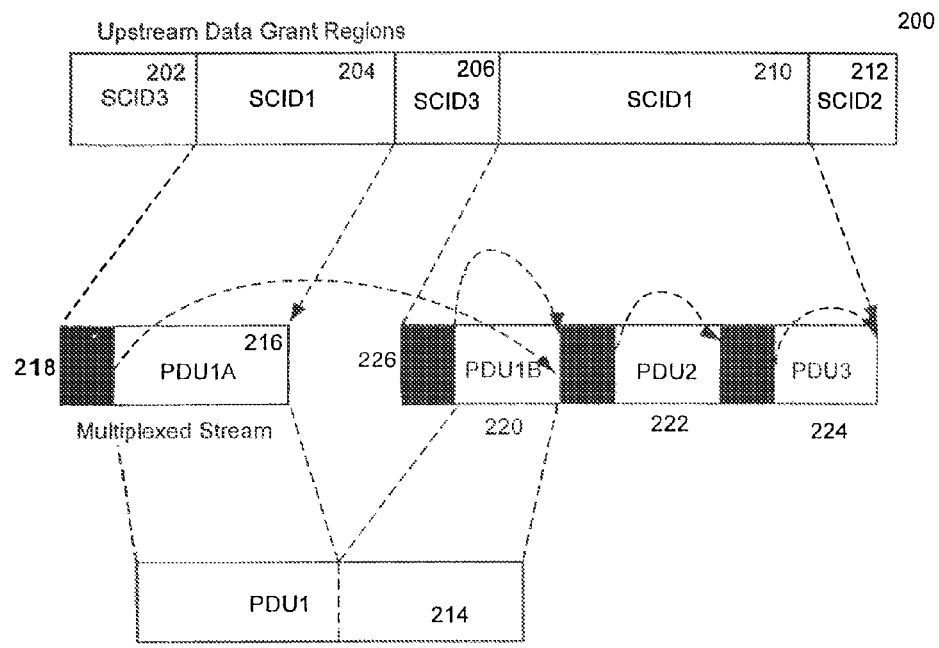
FIG. 2 is a diagram of a grant region and an information packet.

FIG. 2 displays a data multiplexing schematic. The data channel 200 is divided into various grant regions 202-212 by the central controller. These grant regions are assigned by the central controller to different clients requesting time allocations to transmit data. In an illustrative embodiment, a grant region includes an allocation of transmission time. Each signal source has a specific service class identifier, colloquially referred to as a "SCID." Thus, the grant regions 202-212 are labeled according to the SCID of the signal source to which the central controller assigns them. For example, grant region 202 is assigned to client #3, and so is labeled "SCID3."

In FIG. 2, SCID1 204 is assigned to the first signal source, controlled by the client. The client inserts part of information packet 214 into the grant region 204. Grant regions 202 and 206 are assigned to signal source #3, while grant region 204 is assigned to signal source 81. Note that a data packet may also be referred to as a packet data unit, or "PDU." The example shown in FIG. 1 presumes that signal sources #1 and #3 are controlled by different clients.

Unlike an ATM system, the multi-source multiplexing system of the present invention does not require that the client segment data packet 214 into fixed quanta prior to inserting the packet in grant region 204. Rather, once the client determines that it is beneficial to break the packet 214 into two or more parts, the client will do so, and may create a header 218 and append the header to the first part PDU1A 216. The composition of the header is more fully discussed with respect to FIG. 3. The header includes a pointer indicating the end of the data packet to which it is attached, as shown by the dashed arrows of FIG. 2. In other words, the header for each data packet contains a string indicating the overall packet length. In the event that a data packet is split between two grant regions, the header attached to the first portion of the data packet in the first grant region will always point to the end of the final portion of the data packet in another grant region. This is illustrated in FIG. 2 as a dashed arrow originating at the front of PDU1A 216, and terminating at the end of PDU1B 220. The header is not strictly required for all signal flows; for voice flows, the header may be reduced to merely an index to information about the particular voice flow, or in an extreme case, no header at all. This is a consequence of the invention being able to use the central controller's knowledge of which specific client is transmitting in a grant region.

The client breaks PDU1 into two fragments, PDU1A 216 and PDU1B 220. Initially, the header 218 is appended to PDU1A. The size of PDU1A, plus the header, exactly equals the size of grant region SCID1A 204. PDU1A 216 and the header 218 are then inserted into the grant region 204. The size of the grant region 204 is therefore decoupled from the size of the data packet 214.

Continuing with FIG. 2, it can be seen that a portion of PDU1 214 remains to be transmitted, namely, PDU1B 220. Because not all of PDU1 was received by the destination computer, the central controller allocates an additional grant region SCID1B 210 to the client without necessarily waiting for a bandwidth request. A second header 226 is affixed to PDU1B 220; the second header is nearly identical to the header 218 attached to PDU1A 216, with the possible exception of continuation and/or initial segment flags. The client then inserts PDU1B into the grant region SCID 210 and transmits PDU1B accordingly.

In the event that data packet portion PDU1B does not completely fill grant region SCID1B 210, additional data packets originating in the same source, source #1, may be transmitted within the grant region. FIG. 2 displays two additional data packets, PDU2 222 and PDU3 224, transmitted within grant region SCID 210. Unlike ATM or TDM multiplexing, the multi-source multiplexing system of the present invention permits a single grant region to contain multiple data packets. Further, the system permits both voice and data packets, or any combination of data packets from any number of signal sources, to be transferred within the same grant region. This concept is more fully explored with respect to FIG. 8.

The multi-source multiplexing system of the present invention appends a header to each packet transmitted within the same grant region. That is, if a single data packet fills the entire grant region, a single header for that data packet is transmitted within the grant region. However, if multiple data packets are transmitted within the same grant region, then the multi-source multiplexing system attaches a discrete header to each data packet. This is the only circumstance under which multiple headers will be received by the central controller or destination computer within a single grant region. Continuing with FIG. 2, it can be seen that PDU2 222 and PDU3 224 each have an appended header, as required by the system. This permits the destination computer to realize where one data packet ends and another begins.

Figure 3:
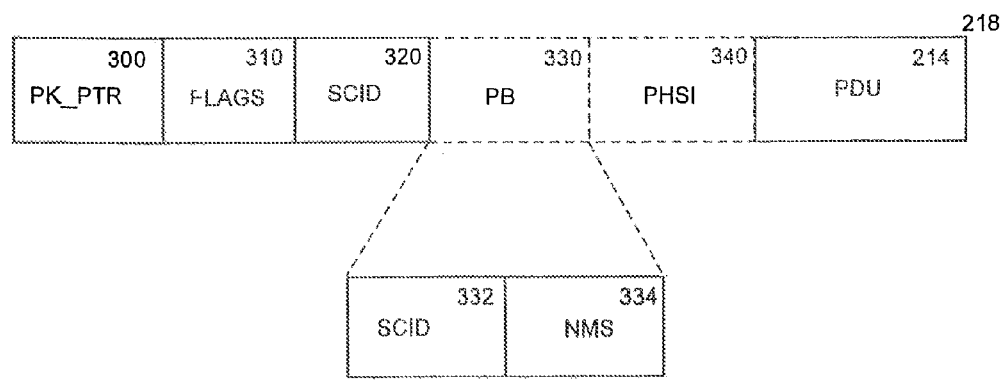
FIG. 3 is a diagram of an information packet header.

FIG. 3 displays a data packet header. The data packet header contains multiple fields, each with a different purpose. Each of these fields will be discussed in turn. The header further typically contains information such as the IP address of the client, other location information, and general data well known to those skilled in the art, none of which are shown on FIG. 3. Table 1 lists the fields included in a typical header, as discussed herein.

TABLE 1

Data transport header field specification

| Field | Usage | Size |
| --- | --- | --- |
| PK_PTR | Length of the PDU in bytes. | 12 bits |
| SCID | Service class identifier of PDU | 1 Byte |
| FLAGS | NPB—Number of piggybacking requests - 2 bits<br>FFI—First fragment indicator - 1 bit<br>HSI—Header suppression indicator - 1 bit | 4 bits |
| PB | Piggybacking request messages | N*2 Bytes |
| PHSI | Payload header suppression index | 0/1 Byte |
| Packet Data | Packet PDU | K Bytes |
| | Length | 3.5 + (2*N + 1) + K Bytes |

The packet pointer 300 (PK_PTR) indicates the number of bytes remaining in a particular packet. The packet pointer essentially serves the purpose of indicating the end of a data packet 214, as mentioned with respect to FIG. 2. Also discussed with respect to FIG. 2 is the service class identifier 320, or SCID.

Each header 218 also contains a FLAGS field 310. The FLAGS field 310 comprises three separate flags (not shown in the figure). The NPB flag indicates the number of piggybacking requests transmitted within the header. Piggybacking is more fully discussed with respect to FIG. 6. The FFI flag indicates whether the header is attached to the first fragment of a data packet 214. Finally, the HSI flag indicates whether header suppression is active.

The header 218 may also contain a piggybacking request field 330. The piggybacking request field is used to transmit requests for additional grant regions 204 from a client to a central controller. The piggybacking request field 330 further comprises two subfields, the SCID subfield 332 and the NMS subfield 334. The SCID subfield contains the service class identifier of the client requesting the additional grant region 214, while the NMS field 334 indicates the size of the grant region requested by the client. In an exemplary embodiment, the entire shared access channel is divided into fixed time slots (often referred to as mini-slots) and the grant regions are then specified via the index to specific mini-slots. In this case, the NMS field 334 contains the number of mini-slots requested by a client.

Piggybacking requests 330 may be included in any data packet 214 transmission. Thus, by way of example, any data packet 214 or data packet fragment 216 may include up to four piggyback requests per grant region 204. Further, a piggyback request 330 may be attached to any data packet fragment 216, regardless of whether the fragment constitutes the first transmission or not. Table 2 displays the fields comprising the piggyback request.

TABLE 2

Piggybacking (PB) request message field specification

| Field | Usage | Size |
| --- | --- | --- |
| SCID | Service class identifier | 1 Byte |
| NMS | Number of mini-slots requested | 1 Byte |
|  | Total length | 2 Bytes |

The following example will illustrate this concept. Returning to FIG. 2, suppose again that data packet 214 is larger than the grant region 204 initially allocated to the client by the central controller. In accordance with the discussion of FIG. 2, PDU1 214 is split into two data packet fragments, PDU1A 216 and PDU1B 220. Insofar as PDU1B may not be transmitted within grant region 204, a request for an additional grant region may be sent by the client. This request may be piggybacked on either PDU1A 216 or PDU1B 220, wherever data transmission would be made more effective. Note that if the grant region has already been requested, the client must only request space equivalent to the piggyback request plus any newly arriving data packets queued for transmission. It may be that PDU1A 216 completely fills grant region 204, and so no additional transmission time is available for the piggyback request 330. In this case, the piggyback request is sent with PDU1B 220. Alternately, it may be that the data packet 214 is fragmented such that PDU1A 216 leaves enough transmission time in the first grant region 204 to accommodate the piggyback request. In this case, the piggyback request 330 is attached to PDU1A 216 and transmitted in the first grant region 204. If there are no further grant regions outstanding, then the system may piggyback the request within the grant region 204 in order to service both the piggyback request 330 and maintain active composite flow.

Including the piggyback request 330 within the header 218 insures that the request for an additional grant region will not be lost, as can occur in a contention interval. Typical shared access networks include a contention region in the transmission channel wherein all grant region requests are written by any client at any time. Oftentimes, this may mean that one request is overwritten by another; because no controls are imposed on the contention region, one client may eliminate another client's request by inserting a request into the same portion of the contention region. When the client includes the piggyback request 330 as a portion of a header 218 transmitted within a grant region 204, the request will never be lost because no other client may write to that grant region.

Referring back to FIG. 3, the header 218 also contains a PHSI field 340. The PHSI field contains the payload Leader suppression index. Only the first fragment of a data packet 214 wherein header suppression is active carries the PHSI field 340. All other data packet fragments 216 may omit the PHSI field, although all headers typically contain the HSI flag.

Briefly described, header suppression embodies the concept that the multi-source multiplexing system may omit certain fields from the second and succeeding headers 220 attached to subsequent data packet fragments once the destination computer has received the first data packet fragment 216 and the associated header 218. The first header 218, attached to the first data packet fragment 216, contains all information normally carried by a header in a shared access network. Because the central controller 190 monitors the location of each data packet 214 or data packet fragment 216 being transmitted and each data packet fragment relating to the same data packet share certain characteristics, information may be deleted from subsequent headers once the initial header is received by the destination computer. For example, the header 218 typically contains the IP address of the client computer. Once the IP address is received as a part of the first header 218 of the first packet of a flow, the next header 226 attached to another data packet fragment 220 comprising the original data packet 214 may omit the IP address. Subsequent packets in the same flow with the same IP address may also suppress the IP address, and may also suppress other information in the header which either does not change, or changes in a completely predictable manner for the entire flow.

Concatenation of Multiple Data Packets

The multi-source multiplexing system of the present invention permits multiple data packets to be transmitted within a single grant region. For example, in FIG. 2 multiple data packets are transmitted in grant region 210. This minimizes wasted bandwidth by permitting a client to transmit additional data packets within a grant region if a single data packet fails to fill the region. This process is referred to as concatenation.

Figure 4:
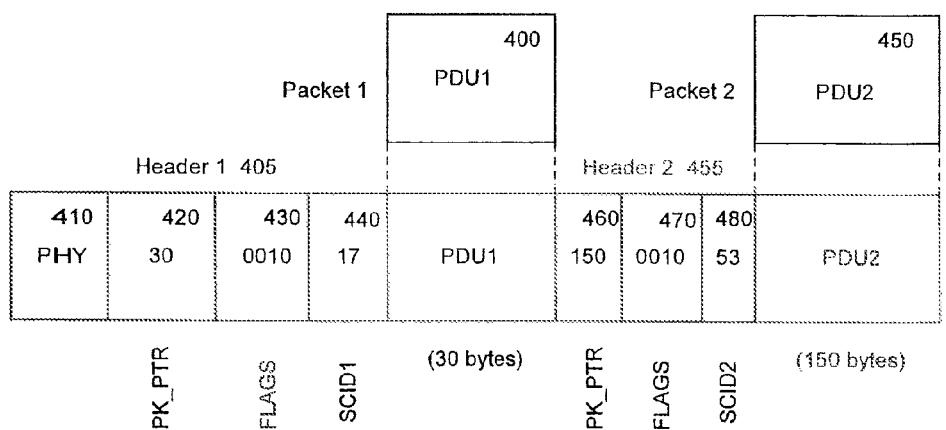
FIG. 4 is a diagram of a set of concatenated information packets.

Each concatenated packet requires a separate header. FIG. 4 displays two concatenated packets, PDU1 400 and PDU2 450. So long as the grant region 204 is large enough to accommodate both packets and their respective headers, both packets may be transmitted within the same region.

The client appends header 1 405 to the first concatenated data packet 400, and header 2 455 to the second concatenated data packet 450. The two headers are not identical; header 1 405 contains a PHY field 410, while header 2 455 does not. The PHY field represent physical overhead restraints, and only appears at the beginning of a transmission.

PK_PTR field 420 has a value of 30, indicating that the first concatenated data packet 400 comprises 30 bytes. Similarly, PK_PTR field 460 indicates that the second concatenated data packet 450 contains 150 bytes of information. Because the PK_PTR 420 value equals the size of the first concatenated packet 400, the multi-source multiplexing system realizes that PDU1 is not a data packet fragment, but instead an entire data packet. In this example, SCID1 440 indicates that PDU1 400 originates from signal source 17, while SCID2 480 indicates that PDU2 comes from signal source 53.

The FLAGS field 430 was more fully described with respect to FIG. 3. In brief, the FLAGS field has a value of 0010. The first two bits (00) are the NPB bits, indicating that no piggyback requests are transmitted. The FFI bit is next. A value of 1 indicates that concatenated data packet 1 400 is the first fragment. (In the case where a data packet 214 is not fragmented, the FFI bit is always 1.) The final bit is the HIS bit, or header suppression indicator. A zero value signals that no header compression is used in the transmission.

Figure 6:
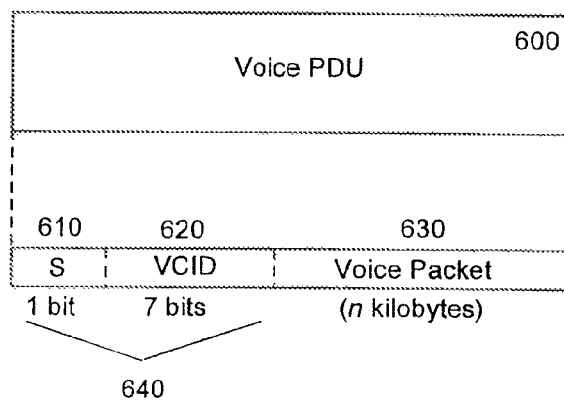
FIG. 6 is a diagram of a voice packet.

As explained further with respect to FIG. 6, the multi-source multiplexing system may also concatenate data packets from multiple sources which have a predetermined relationship to each other.

Fragmentation and Transport of a Data Packet

Figure 5:
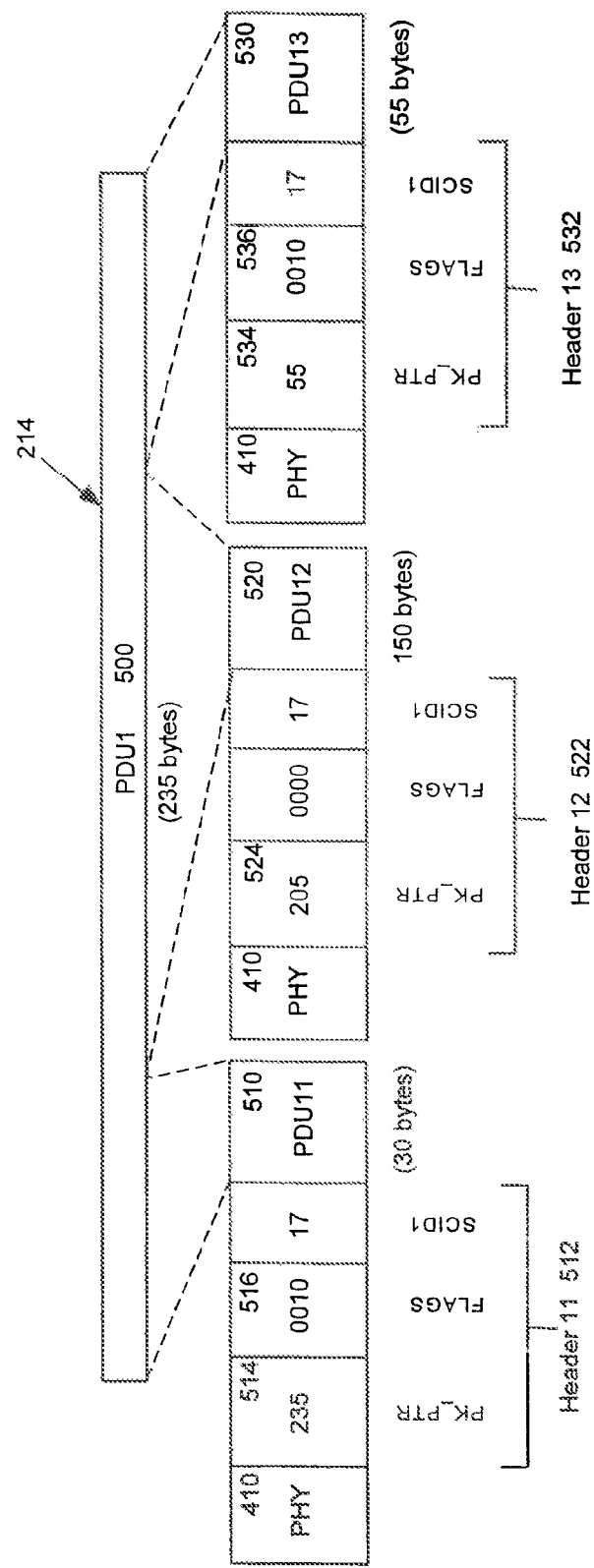
FIG. 5 is a diagram of a fragmented information packet.

FIG. 2 depicts the concept of data packet fragmentation. FIG. 5 shows a further example of fragmentation and explores fragmentation in greater detail. When a data packet is fragmented, the multi-source multiplexing system 100 splits the packet into multiple data packet fragments 216. The multi-source multiplexing system appends a header 218 to each of these data packet fragments. Further, PHY overhead 410 is present at the beginning of every transmission for the first data packet fragment 216 within a separate grant region.

FIG. 5 shows a data packet 214 consisting of 235 bytes. This data packet is fragmented into three separate data packet fragments: PDU11 510 (30 bytes), PDU12 520 (150 bytes), and PDU13 530 (55 bytes). Each data packet fragment has an appended header; namely header 11 512, header 12 522, and header 13 532, respectively.

The packet pointer field 300 (PK_PTR) generally indicates the number of bytes remaining to be transmitted, including the current data packet fragment 216. Thus, the first PK_PTR field 514 has a value of 235, indicating that 235 bytes must be transmitted before all of data packet PDU1 500 is received. Similarly, the second PK_PTR field 524 has a value of 205; 30 bytes of the data packet PDU1 500 were transmitted as PDU11 510, and 205 remain. Once PDU12 520 is transmitted within a grant region 204, 55 bytes of the original data packet PDU1 500 remain. Thus, when header 13 532 is created and appended to PDU13 530, the third PK_PTR field 534 has a value of 55. As mentioned with respect to FIG. 2, all packet pointer fields 300 point to the end of the data packet 214.

Note that only the FLAGS field 516 corresponding to the first data packet fragment PDU11 510 has the FFI bit set to 1, indicating that PDU11 is the first data packet fragment 216 of data packet PDU1 500.

Dual-Source Concatenation

The multi-source multiplexing system 100 may transmit voice across a data channel or data across a voice channel. Voice data is transmitted in the form of voice packets within a grant region, and may be handled in much the same manner as data packets. For example, the multi-source multiplexing system 100 may concatenate and fragment voice packets. This is in contrast to conventional systems such as the DOCSIS cable modem specification, where data must be transmitted via a data channel and voice via a voice channel. Data packets and voice packets may be handled differently by the system in some respects, as detailed below.

FIG. 6 displays a voice packet 600. The voice packet is also referred to by the abbreviation "voice PDU", or "packet data unit." The client may transmit voice packets 600 across a dedicated voice channel. The voice channel carries voice packets only; no data packets 214 are present. Unlike data packet transport, the multi-source multiplexing system 100 does not require a request from a client in order to allocate a grant region on the voice channel. Rather, the central controller transmits unsolicited grant regions to the client on a routine basis.

Each voice packet 600 also has a voice header 640 appended prior to transport. This header has a fundamentally different makeup than a data header 218, because voice data packets 600 are typically of a fixed size and transmitted at fixed intervals. Therefore, certain data may be omitted from the voice header 640, reducing it in size and conserving bandwidth. As previously mentioned, the voice header may be reduced such that it is no longer a header in the traditional sense, but merely an index for demultiplexing sub-flows. If there are no sub-flows, then there is no need for a header. The following description indicates the operation where there is a single byte voice header. The voice packet header 640 is composed of two parts; a silence flag 610 and a voice channel identification (VCID) flag 620. The silence flag indicates whether a voice packet contains voice data, or is silent. The VCID flag contains an identifying bit string corresponding to the transmitting client. The destination computer employs the VCID flag to demultiplex incoming voice packets 600.

The presence of the silence flag 610 in the voice header 640 also permits the multi-source multiplexing system 100 to monitor the voice channel for periods wherein the voice packets 600 contain no voice data, and reallocate bandwidth to other clients accordingly. This process is referred to as "silence suppression." By employing silence suppression, the multi-source multiplexing system 100 may make additional bandwidth available to high-demand clients, while minimizing wasted transmission time otherwise employed to keep open a silent voice channel.

In a typical shared access network, voice packets are typically 20 to 50 bytes in length, while data packets may be up to 1518 bytes long. Further, voice transmissions occur at 4 to 64 kilobits per second, while data transmission may occur in bursts at rates up to 1.5 megabits per second or more. Voice packets are thus typically much smaller than data packets. This presents unique problems for transporting both data and voice. Grant regions 204 in the present invention may thus be used for transmitting either voice or data, and for requesting additional bandwidth for voice or data, in accordance with a predetermined policy.

For example, a single grant region 204 may contain both a data packet and a voice packet. While the central controller typically allocates a grant region for a specific source's use, as indicated by the SCID attached to the grant region, the multi-source multiplexing system may freely place any information packet from any source, including an audio source such as a telephone, into the allocated grant region. The system evaluates the size and priority of each existing information packet at the time the client receives the grant region, and assigns an information packet to the grant region based on the results of this evaluation. Potential factors in the client's grant region allocation evaluation include relative priority of the information packet, size of the information packet, and length of time the information packet has waited to be transmitted. For example, voice data such as that generated by a telephone typically possess a very high priority, because voice data packets must be delivered in a real-time manner. If significant transmission delays separate two voice data packets, then a listener perceives a silence between sounds. This is unacceptable during a telephone conversation. Thus, the priority of a voice packet must be weighed against the size of a data packet when deciding which to transport within a given grant region.

Figure 7:
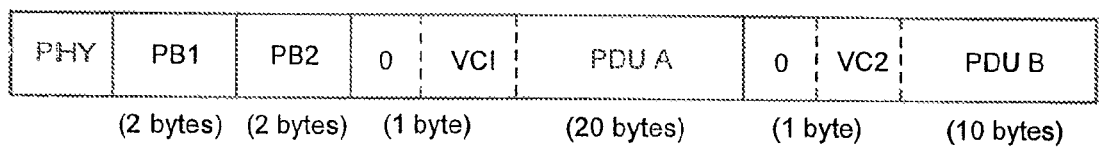
FIG. 7 is a diagram of a set of concatenated voice packets.

FIG. 7 displays two concatenated voice packets 600. Voice packets are concatenated in a manner similar to that for data packets. The voice packets are PDU A 700 and PDU B 710. Both PDU A and PDU B have appended headers. The PDU A header 705 and the PDU B header 715 are each one byte (eight bits) long, and consist of a silence bit 610 and a VCID flag 620. Concatenated voice packets may be inserted into a grant region 204 just as concatenated data packets 214 are.

The concatenated voice packets 600 also contain two piggyback requests, PB1 720 and PB2 730. These piggyback requests operate exactly like piggyback requests in a concatenated data packet. Finally, physical layer (PHY) overhead 740 is present at the beginning of the concatenated voice packets.

The multi-source concatenation system of the present invention also permits a client to transmit an information packet 214 from one signal source in a grant region 204 allocated to a different signal source. The system may, in conjunction with a predetermined policy used by the system, effectively ignore the fact that the central controller has allocated a grant region for a specific source if the system determines that transporting another information packet 214 within the grant region yields a higher transmission efficiency and/or reduced delay and/or increased performance.

FIG. 8 displays an example of using a first source's grant region 204 to transport information packet 214 emanating from a second source. For purposes of this example, header size will be ignored. Source 1 850 generates an information packet 214, namely PDU A 830. PDU A totals 125 bytes. Similarly, source 2 860 generates information packet PDU B 840, which contains 40 bytes of information. The central controller assigns a 50 byte grant region 204 in the data channel 200 to PDU A, namely the first grant region 800. Because the first grant region cannot contain the entirety of PDU A 830, the central controller also assigns a second grant region 810 to PDU A. Note that both the first grant region 800 and the second grant region 810 are assigned to PDU A, because they carry the identifier "SCID 1," indicating for which service class they are intended. By contrast, grant regions SCID 10 850, SCID 4 860, and SCID 2 820 are intended for different PDUs. Some of these other PDUs may be controlled by separate clients.

The client determines upon receipt of the first grant region 800 the most efficient use of the grant region by evaluating the relative sizes, priorities, and other characteristics of PDU A 830 and PDU B 840. In this case, no other information packets enter into the evaluation, because the client does not possess any others. However, the determination may take into account as many information packets as the client can control at a single point in time.

Continuing with the example, the client may determine that PDU B 840 is better suited for transport in the first grant region 800, because PDU B fits entirely within the region. By contrast, PDU A 830 would require fragmentation in order to utilize any portion of the first grant region. Thus, the client inserts PDU B 840 into the first grant region, despite the fact that the central controller allocated the region to PDU A. Since some space remains in the first grant region 800, PDU A is fragmented into two data packet fragments: PDU A1 832 and PDU A2 834. The client ensures that PDU A1 exactly fills the space remaining within the first grant region 800 when fragmenting PDU A 830. PDU A1 is then inserted at the beginning of the first grant region, while PDU A2 is held until the second grant region 810 is received by the client. Thus, a grant region intended for use by a specific information packet may be filled by a different information packet, depending on the outcome of the client's efficiency evaluation. This evaluation is further discussed in the section below labeled "Multi-Source Concatenation Algorithm."

Further, there is no requirement in the example given in FIG. 8 that PDU A 830 and PDU B 840 be the same type of information packet 214. For example, PDU A may be a data packet created by a computer application program, while PDU B may be a voice packet from a telephone.

The multi-source, multiplexing system may also create a more efficient composite flow from a plurality of individual flows originating from distinct signal sources when the system controls several different cable modems which have a predetermined relationship. In an illustrative embodiment of the present invention, the predetermined relationship includes routing two distinct sources through a common point. An example of a common point includes a cable modem. In an alternative illustrative embodiment, the predetermined relationship between two sources includes a first data request and a second data request from a single computer program. In another alternative embodiment, the predetermined relationship includes the relationship between a control program and a subordinate program. In the event that contiguous grant regions 204 are assigned to information packets 214 controlled by the same multi-source multiplexing system, the contiguous information regions may be used as a single information region. Returning to FIG. 8, presume that the central controller assigns a third grant region 860 to a PDU controlled by the same client as PDU A 830 and PDU B 840. In this case, then PDU A may be placed into the combination of the first grant region 800 and the third grant region 860 without fragmenting the data packet. Essentially, the first grant region and the third grant region are contiguous, and therefore may be treated by the multi-source multiplexing system as a single grant region 204 by the client. This eliminates the need for information packet fragmentation and the necessity of consuming transmission time through adding a header to each information packet fragment. Further, it is possible to reduce or eliminate PHY overhead in the process, in order to obtain additional efficiency in transmission.

Multi-Source Concatenation Algorithm

The client employs an algorithm to fragment and concatenate information packets. This algorithm uses the priority of information packets waiting for transmission to determine the best fit for a specific grant region, and to determine whether a second source's information packet may more efficiently be transmitted in the grant region allocated to a first source. The algorithm follows.

A policy is defined whereby packets from different signal sources are classified. The classification can include, but is not limited to, priority, delay tolerance, jitter tolerance, fragmentation tolerance, and header suppression tolerance. The classification and policy are then used by the multi-source multiplexing system to determine the order in which data packets are selected for transport in the grant regions. The classification can be set prior to system operation, or can be adapted on the fly based on traffic loading, transport delays, and similar network performance metrics. Policies may reference the individual signal source, the type of signal source, the device, the network, or the application through which multiple signal sources exist.

One example of a policy is that information packets of highest priority are transmitted first without concern for the size of the grant region, with lower priority information packets being sent in order of decreasing priority. Information packets with equal priority would be sent in the order in which they were queued by the multi-source multiplexing system. Another policy would include the method just described in addition to taking account of the duration of the available grant region. Information packets would be transmitted in order of priority but also by selecting from information packets of equal priority, those packets which best fill the available grant region and do not require additional fragmentation, regardless of the amount of time which has transpired since the information packet was initially queued. Yet another policy would include both methods just described, and add a mechanism for altering the priority of information packets based on the time since packets were initially queued. Packets that have been queued for longer than a predetermined time would be reassigned the highest priority for transport, regardless of the duration of the available grant region.

CONCLUSION

The multi-source multiplexing system may include additional functionality not herein specifically described. For example, the system may allow a user to set priorities for multiplexing various information packets. The multi-source multiplexing system may also accept multiple types of sources beyond those listed, including input from remote locations, additional audio sources such as a microphone, or other computer-readable data. Many other modifications and additional features will become evident in view of the preceding description of the embodiments of the invention. It should be understood, therefore, that the foregoing relates only to certain embodiments of the invention, and that numerous changes may be made therein without departing from the spirit and scope of the invention as defined by the following claims.

What is claimed is:

1. A wireless communication system comprising:
a multiplexing system configured to:
   receive a plurality of data packets from at least one signal source in a plurality of signal sources,
   determine an efficiency of allocation of a first grant region for transmission of a first data packet from a first signal source in the plurality of signal sources,
   locally allocate the first grant region based on respective priorities of the plurality of data packets and the determined efficiency of allocation, wherein the local allocation of the first grant region is different than a network allocation received from a network, and
   multiplex the data packets onto the network; and
a demultiplexing system configured to demultiplex the data packets.

2. The wireless communication system of claim 1, wherein the signal source is at least one of:
a telephone signal source,
an audio stream,
a computer program, or
a set-top box.

3. The wireless communication system of claim 1, wherein the multiplexing system and the demultiplexing system are software systems running on a cable modem system.

4. The wireless communication system of claim 1, wherein the network comprises a central controller.

5. The wireless communication system of claim 4, wherein the central controller is at least one of:
a cable modem termination system,
a power line network,
a wireless cable network, or
a satellite network.

6. The wireless communication system of claim 1, wherein the multiplexing system comprises:
a plurality of devices coupled to corresponding signal sources in the plurality of signal sources; and
a client configured to receive the data packets from the devices.

7. The wireless communication system of claim 6, wherein the devices are cable modems, and wherein the client comprises:
a cable modem termination system, and
a client cable modem.

8. The wireless communication system of claim 1, wherein the multiplexing system is further configured to transmit, in the first grant region, a request to the network for an additional grant region.

9. The wireless communication system of claim 8, wherein the multiplexing system is configured to transmit a first fragment of the first data packet to the network in the first grant region.

10. The wireless communication system of claim 8, wherein the multiplexing system is further configured to:
access classification information associated with each data packet in the plurality of data packets; and
locally allocate the first grant region based at least in part on the classification information.

11. A method comprising:
receiving a plurality of data packets from at least one signal source in a plurality of signal sources;
determining an efficiency of allocation of a first grant region for transmission of a first data packet from a first signal source in the plurality of signal sources;
locally allocating the first grant region based on respective priorities of the plurality of data packets and the determined efficiency of allocation, wherein the local allocation of the first grant region is different than a network allocation received from a network; and
multiplexing the data packets onto the network.

12. The method of claim 11, wherein the signal source is at least one of:
a telephone signal source,
an audio stream,
a computer program, or
a set-top box.

13. The method of claim 11, wherein the multiplexing system and the demultiplexing system are software systems running on a cable modem system.

14. The method of claim 11, further comprising:
transmitting, in the first grant region, a request to the network for an additional grant region.

15. The method of claim 14, further comprising:
transmitting a first fragment of the first data packet to the network in the first grant region.

16. The method of claim 14, further comprising:
accessing classification information associated with each data packet in the plurality of data packets; and
locally allocating the first grant region based at least in part on the classification information.

17. A wireless communication system comprising:
a processor; and
a memory storing instructions, execution of which causes the processor to perform operations comprising:
   receiving a plurality of data packets from at least one signal source in a plurality of signal sources,
   determining an efficiency of allocation of a first grant region for transmission of a first data packet from a first signal source in the plurality of signal sources,
   locally allocating the first grant region based on respective priorities of the plurality of data packets and the determined efficiency of allocation, wherein the local allocation of the first grant region is different than a network allocation received from a network.

18. The wireless communication system of claim 17, wherein the operations farther comprise:
transmitting, in the first grant region, a request to the network for an additional grant region.

19. The wireless communication system of claim 18, wherein the operations further comprise:
   transmitting a first fragment of the first data packet to the network in the first grant region.

20. The wireless communication system of claim 18, wherein the operations further comprise:
   accessing classification information associated with each data packet in the plurality of data packets; and
   locally allocating the first grant region based at least in part on the classification information.

* * * * *